US007640028B2

(12) United States Patent
Maheshwari et al.

(10) Patent No.: US 7,640,028 B2
(45) Date of Patent: Dec. 29, 2009

(54) APPARATUS, METHOD AND COMPUTER PROGRAM PRODUCT PROVIDING ENHANCED LOCATION UPDATE SCHEME FOR MOBILE STATION IN A RELAY-BASED NETWORK

(75) Inventors: Shashikant Maheshwari, Irving, TX (US); Yousuf Saifullah, Richardson, TX (US)

(73) Assignee: Nokia Corporation, Espoo (FI)

( * ) Notice: Subject to any disclaimer, the term of this patent is extended or adjusted under 35 U.S.C. 154(b) by 592 days.

(21) Appl. No.: 11/479,163

(22) Filed: Jun. 30, 2006

(65) Prior Publication Data

US 2008/0003943 A1 Jan. 3, 2008

(51) Int. Cl.
*H04Q 7/20* (2006.01)

(52) U.S. Cl. .................... 455/458; 455/11.1; 455/412.2; 455/456.2

(58) Field of Classification Search ................ 455/11.1, 455/412.2, 458, 557.6, 67.11, 456.1, 456.2, 455/518, 438, 575.6, 411, 410, 435.1, 574, 455/414.1, 436
See application file for complete search history.

(56) References Cited

U.S. PATENT DOCUMENTS

| 6,735,736 | B2 * | 5/2004 | Korall et al. ................ 714/776 |
| 7,072,654 | B2 | 7/2006 | Fujiwara et al. ........... 455/435.1 |
| 7,418,264 | B2 | 8/2008 | Kim ............................ 455/436 |
| 2004/0179492 | A1 * | 9/2004 | Zhang et al. ................ 370/331 |
| 2005/0233732 | A1 * | 10/2005 | Kwak et al. ................ 455/414.1 |
| 2005/0250474 | A1 * | 11/2005 | Hong et al. ................. 455/411 |
| 2006/0025134 | A1 | 2/2006 | Cho et al. ................. 455/435.1 |
| 2006/0089161 | A1 | 4/2006 | Kim et al. .................... 455/458 |
| 2007/0105567 | A1 * | 5/2007 | Mohanty et al. ............ 455/458 |

(Continued)

FOREIGN PATENT DOCUMENTS

EP 1328132 A1 7/2003

OTHER PUBLICATIONS

Maheshwari, S. et al., "MRS Paging Group Update", Aug. 1, 2007, IEEE C802.16j-07/030, retrieved from: http://www.ieee802.org/16/relay, pp. 1-7.
IEEE Std 802.16e™-2005 and IEEE Std 802.16™-2004/Cor1-2005, pp. 1-268.

(Continued)

*Primary Examiner*—Tan Trinh
(74) *Attorney, Agent, or Firm*—Harrington & Smith, PC (57) ABSTRACT

A method, a computer program product and a network access node that operate to receive a message from a mobile relay node, the message including a request to add a particular paging group (PG) identification to a list of paging group identifications transmitted by the network access node; to contact a network backbone node to request permission to add the particular paging group identification to the list of paging group identifications transmitted by the network access node; and upon being granted permission, to add the particular paging group identification to the list of paging group identifications transmitted by the network node. The exemplary embodiments of this invention pertain also to the relay node and to the network backbone node. Through the use of the exemplary embodiments idle state user nodes that are attached to the mobile relay node do not see a change in the PG, since the particular PG is maintained by the mobile relay node and, therefore, the user nodes do not initiate a Location Update (LU) procedure when the relay node enters a new PG. Instead, only the mobile relay node performs the LU procedure with the network access node.

27 Claims, 5 Drawing Sheets

U.S. PATENT DOCUMENTS

2007/0243910 A1* 10/2007 Ryu et al. .................. 455/574
2007/0249347 A1* 10/2007 Saifullah et al. ............ 455/436
2008/0002741 A1* 1/2008 Maheshwari et al. ........ 370/473

OTHER PUBLICATIONS

Zhang, H. et al., "Idle Mode Location Update Enhancements", Jul. 7, 2004, IEEE C802.16e-04/223rl, 3 pages.

* cited by examiner

APPARATUS, METHOD AND COMPUTER PROGRAM PRODUCT PROVIDING ENHANCED LOCATION UPDATE SCHEME FOR MOBILE STATION IN A RELAY-BASED NETWORK

TECHNICAL FIELD

The teachings in accordance with the exemplary embodiments of this invention relate generally to wireless communications networks, devices, methods and computer program products and, more specifically, relate to those networks that include a relay node.

BACKGROUND

The following abbreviations are defined as follows:

RS Relay Station

BS Base Station

MS Mobile Station

SS Subscriber Station

AP Access Point

CDMA Code Division Multiple Access

LU Location Update

PG Paging Group

PC Paging Controller

NE Network Entity

DCD Downlink Channel Descriptor

DL Downlink (BS towards MS via RS)

UL Uplink (MS towards BS via RS)

As wireless technology has advanced, a variety of wireless networks have been installed, such as cellular and other wireless networks. Some wireless networks are based upon the Institute of Electrical and Electronics Engineers (IEEE) 802.11 family of Wireless LAN (WLAN) industry specifications. Other wireless technologies are being developed, such as IEEE 802.16, also referred to as WiMax, industry specifications. IEEE 802.16 defines the wireless air interface specification for wireless metropolitan area networks. A number of working groups are engaged in efforts to improve on this technology.

In WiMAX or in general other cellular-type wireless systems, the MS belongs to one PAGING_GROUP area. Similarly the BS also belongs to one (or more) PAGING_GROUP(s). A PAGING_GROUP ID that identifies a particular PAGING_GROUP is transmitted on a broadcast channel (in WiMAX, it is transmitted on a DCD and/or MOB_PAG_ADV message). The MS monitors these messages (MOB_PAG_ADV message is transmitted according to MS PAGING_CYCLE and PAGING OFFSET). When the MS moves from one PAGING_GROUP area to another PAGING_GROUP area, it initiates a location update procedure. As per the current specification of IEEE802.16 (IEEE802.16-2004 and IEEE802.16e-2005), the location update procedure is performed between the MS and the BS. Similarly, when the RS moves from one PG to another PG it will initiate a location update procedure.

A wireless relay network is a multi-hop system in which end nodes (e.g., MS/SSs) are connected to the BS or AP via a RS. All traffic between the end nodes and the BS/AP passes through, and is processed by, the RS. One non-limiting example of a relay network is currently under discussion for 802.16 Mobile Multi-hop Relay (MMR), which is a task group 802.16j. The MMR work focuses on defining a network system that uses RSs to extend the network coverage and/or to enhance the system throughput.

As may be appreciated, if the RS is itself mobile, such as by being installed on a mobile platform such as a vehicle (a terrestrial vehicle, a water-based vehicle, or an airborne vehicle), the mobility of the RS with respect to the BS and the MS (or SS) adds an additional level of system complexity. In practice, a given RS may have numerous MSs attached to it at any given time. If the RS moves out of one location area (defined by a Paging Group) to another location area (defined by another Paging Group), this event will trigger location update signaling for all of the idle state MSs attached to the mobile RS. This event would thus abruptly increase the signaling message load and increase overall congestion in the system since all idle state MSs will essentially simultaneously perform the location update procedure, which involves a bidirectional signaling message flow, via the RS, between the BS and the affected idle state MSs.

SUMMARY OF THE EXEMPLARY EMBODIMENTS

The foregoing and other problems are overcome, and other advantages are realized, in accordance with the non-limiting and exemplary embodiments of this invention.

In accordance with an exemplary aspect thereof the embodiments of this invention provide a method, a computer program product and a relay node that operate, in response to a detecting a new paging group identification, to send a message to a network node, the message requesting the network access node to use a particular paging group identification; while waiting for the network access node to begin using the particular paging group identification, to modify a message received from the network access node to include the particular paging group identification; and to send the modified message to a group of attached user nodes.

Further in accordance with an exemplary aspect thereof the embodiments of this invention provide a method, a computer program product and a network access node that operate to receive a message from a relay node, the message comprising a request to add a particular paging group identification to a list of paging group identifications transmitted by the network access node; to contact a network backbone node to request permission to add the particular paging group identification to the list of paging group identifications transmitted by the network access node; and upon being granted permission, to add the particular paging group identification to the list of paging group identifications transmitted by the network node.

In accordance with another exemplary aspect thereof the embodiments of this invention provide a method, a computer program product and a network backbone node that operate to receive a message from a network access node, the message comprising a request originated by a relay node to add a particular paging group identification to a list of paging group identifications transmitted by the network access node and, upon granting the request, to instruct network access nodes associated with at least one paging group to add the particular paging group identification to the list of paging group identifications transmitted by the network access nodes. A further operation entails subsequently instructing the network access nodes associated with the at least one paging group to delete the particular paging group identification to the list of paging group identifications transmitted by the network access nodes.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

The exemplary embodiments of this invention solve at least the one problem discussed above related to a mobile RS by providing an enhanced location update procedure.

The exemplary embodiments of this invention relate generally to mobile multi-hop RS by providing a signaling-optimized location update procedure when the RS is mobile (e.g., associated with a mobile platform). An exemplary, but non-limiting embodiment, is described in the context of IEEE 802.16 technology (WiMAX).

The exemplary embodiments of this invention provide that a mobile RS have an associated PG, and that all MSs that are attached to the network (through a BS) via the mobile RS have the same PG as that of the mobile RS. This type of operation may be controlled and co-ordinated by a network entity (e.g., by the PC) in the backbone network.

Of interest to the ensuing discussion of the exemplary embodiments of this invention is IEEE Std 802.16e™-2005 and IEEE Std 802.16™-2004/Cor1-2005, such as pages 1-268 which discuss in part the DCD message, sleep mode, idle mode and location update operations. At least this portion of IEEE Std 802.16e™-2005 and IEEE Std 802.16™-2004/Cor1-2005 is incorporated by reference herein.

Figure 1:
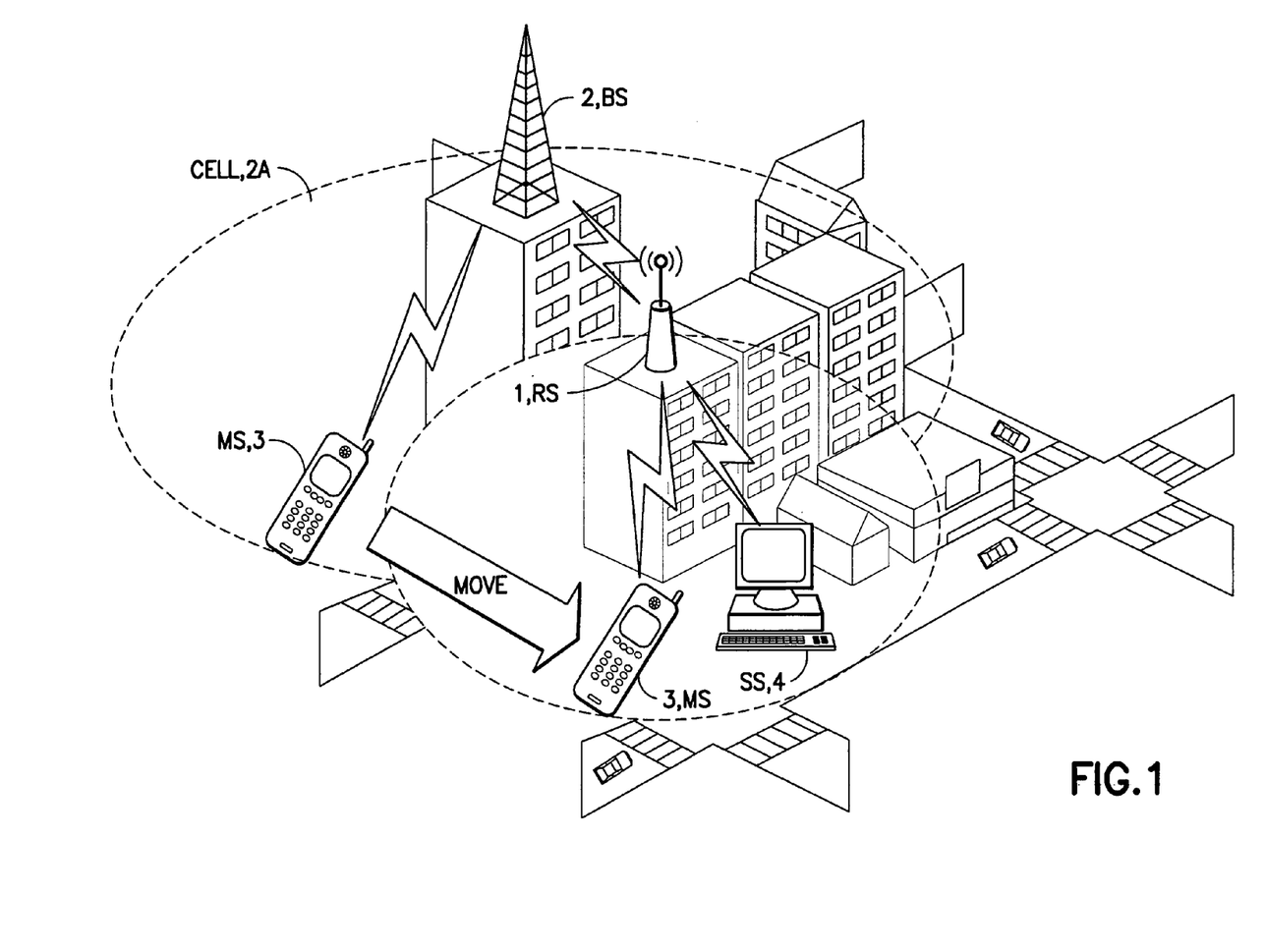
FIG. 1 shows an exemplary usage scenario of a RS.

FIG. 1 shows an exemplary usage scenario of a RS 1 (or relay node) that is wirelessly interposed between a BS 2 (which may be construed generally to be a network access node), having an associated cell 2A, and a MS 3 and a SS 4. Note in this example that the MS 3 (which may be construed generally to be a user node, as may the SS 4) is originally located within the cell 2A, and thus communicates directly with the BS 2. Due to movement of the MS 3 it finds itself outside of the cell boundary, and at this time is coupled to the BS 2 via the RS 1. The SS 4, which can be assumed for this non-limiting example to be a desktop or similar type of computing device, is considered to be stationary or relatively stationary at a location outside of the cell boundary, and thus is persistently coupled to the BS 2 via the RS 1. For the purposes of explaining the exemplary embodiments of this invention it is assumed that the RS 1 is also mobile and is capable of moving from one Paging Group to another. It is further assumed that the RS 1 and the BS 2 are constructed so as to operate in accordance with the exemplary embodiments of this invention, as described in detail below.

Note that various embodiments of the MS/SS 3,4 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Figure 4:
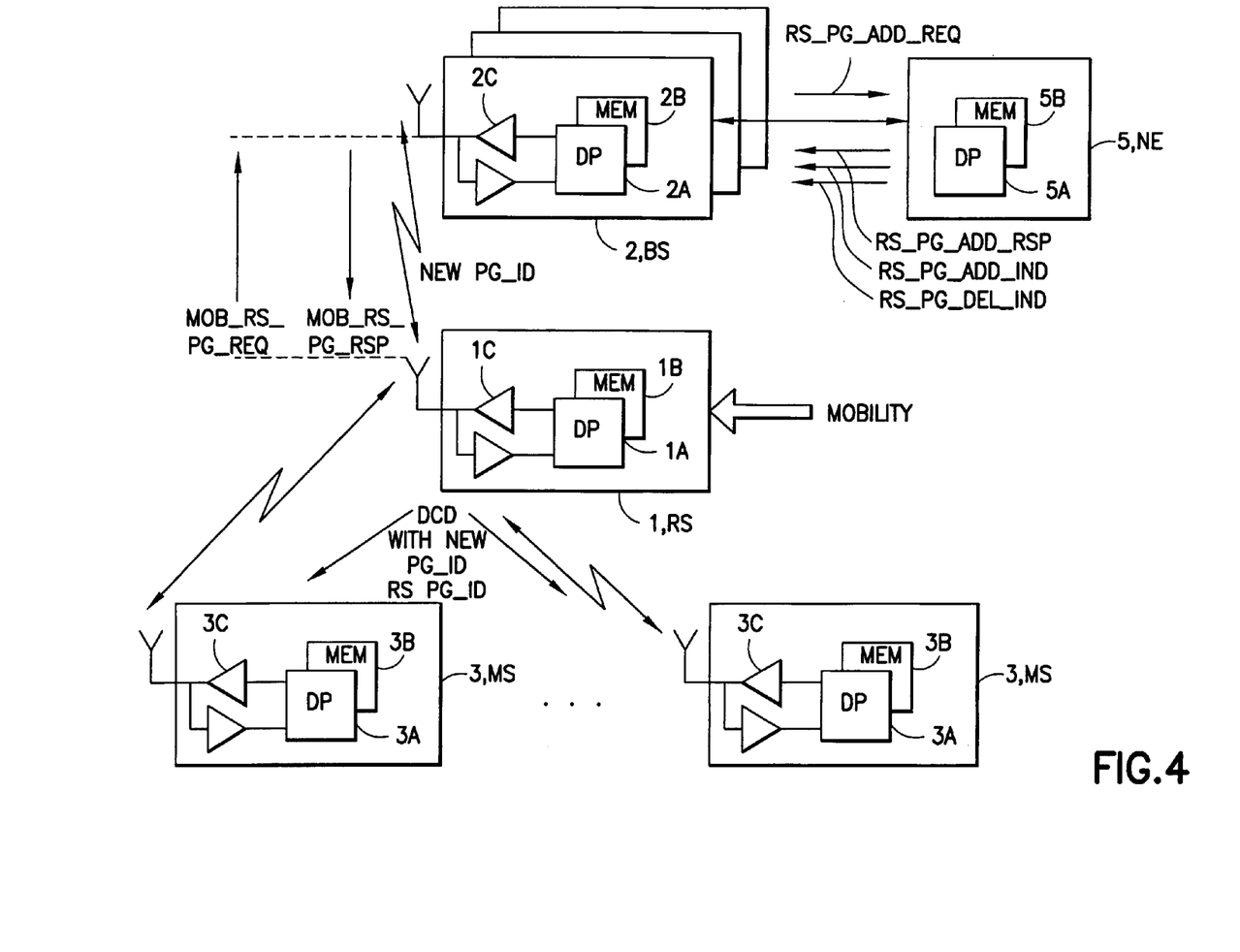
FIG. 4 is a block diagram that shows in greater detail the RS, BS, MSs and NE (PC) of FIGS. 1 and 3, and that also shows exemplary message flows in accordance with FIGS. 2 and 3.

Referring also briefly to FIG. 4, the exemplary embodiments of this invention may be implemented by computer software executable by a data processor (DP 1A) of the RS 1, a DP 2A of the BS 2, a DP 5A of a NE 5, or by hardware, or by a combination of software and hardware. If one assumes that the RS 1, BS 2 and NE 5 include a memory device or system (MEM 1B, 2B, 5B) that stores the applicable software program(s), then the memory may be of any type suitable to the local technical environment and may be implemented using any suitable data storage technology, such as semiconductor-based memory devices, magnetic memory devices and systems, optical memory devices and systems, fixed memory and removable memory. The DPs of the RS 1, BS 2 and NE 5 may also be of any type suitable to the local technical environment, and may include one or more of general purpose computers, special purpose computers, microprocessors, digital signal processors (DSPs) and processors based on a multi-core processor architecture, as non-limiting examples. The RS 1 is assumed to include at least one wireless transceiver 1C, and the BS 2 is also assumed to include at least one wireless transceiver 2C. In FIG. 4 (and FIG. 5) the NE 5 is assumed to be bidirectionally coupled to the BSs 2 over the network backbone, depicted generically as the link 6.

It may be assumed that the MSs 3 (and also SSs 4) are similarly constructed, as is also shown in FIG. 4.

In accordance with the exemplary embodiments of this invention, when the mobile RS 1 enters a new PG area and detects the change in the PG, it requests the network to add the PG of the RS 1 to the current PG list that is being transmitted by all the BSs in the new PG area. The RS 1 also modifies DCD and/or MOB_PAG_ADV messages received from the BS 2 to add its own PG into the DCD and/or MOB_PAG_ADV messages until the mobile RS 1 receives an acknowledgment from network of the addition of mobile RS's PG into the PG list.

Through the use of this process an idle state MS 3 that is attached to mobile RS 1 does not see a change in the PG and, therefore, does not initiate a LU procedure. Instead, only the mobile RS 1 needs to perform the LU procedure with the BS 2. As may be appreciated, through the use of the exemplary embodiments of this invention the need for the attached idle state MSs 3 to perform LU procedures, due to mobility of the RS 1, can be substantially eliminated, thereby conserving bandwidth resources and removing/reducing contention on the BS-RS and RS-MS links.

That is, when the MS 3 moves along with mobile RS 1 the MS 3 is not required to perform a LU procedure. Only when the MS 3 moves out of the mobile RS 1 coverage area, or first enters into the mobile RS 1 coverage area, does the MS 3 need to perform the LU procedure.

Describing the exemplary embodiments now in greater detail, assume that the mobile RS 1 has a PG=R. This PG can be assigned to the mobile RS 1 by the network. Also, the MS 3 attached to the network via the mobile RS 1 will have the same PG=R as that of mobile RS 1. Note, that the PAGING_CYCLE and PAGING_OFFSET of the MS 3 may be the same as, or may be different from, the PAGING_CYCLE and PAGING_OFFSET of the mobile RS 1. However, this does not have any impact on the operation of the system in accordance with the exemplary embodiments of this invention.

Figure 5:
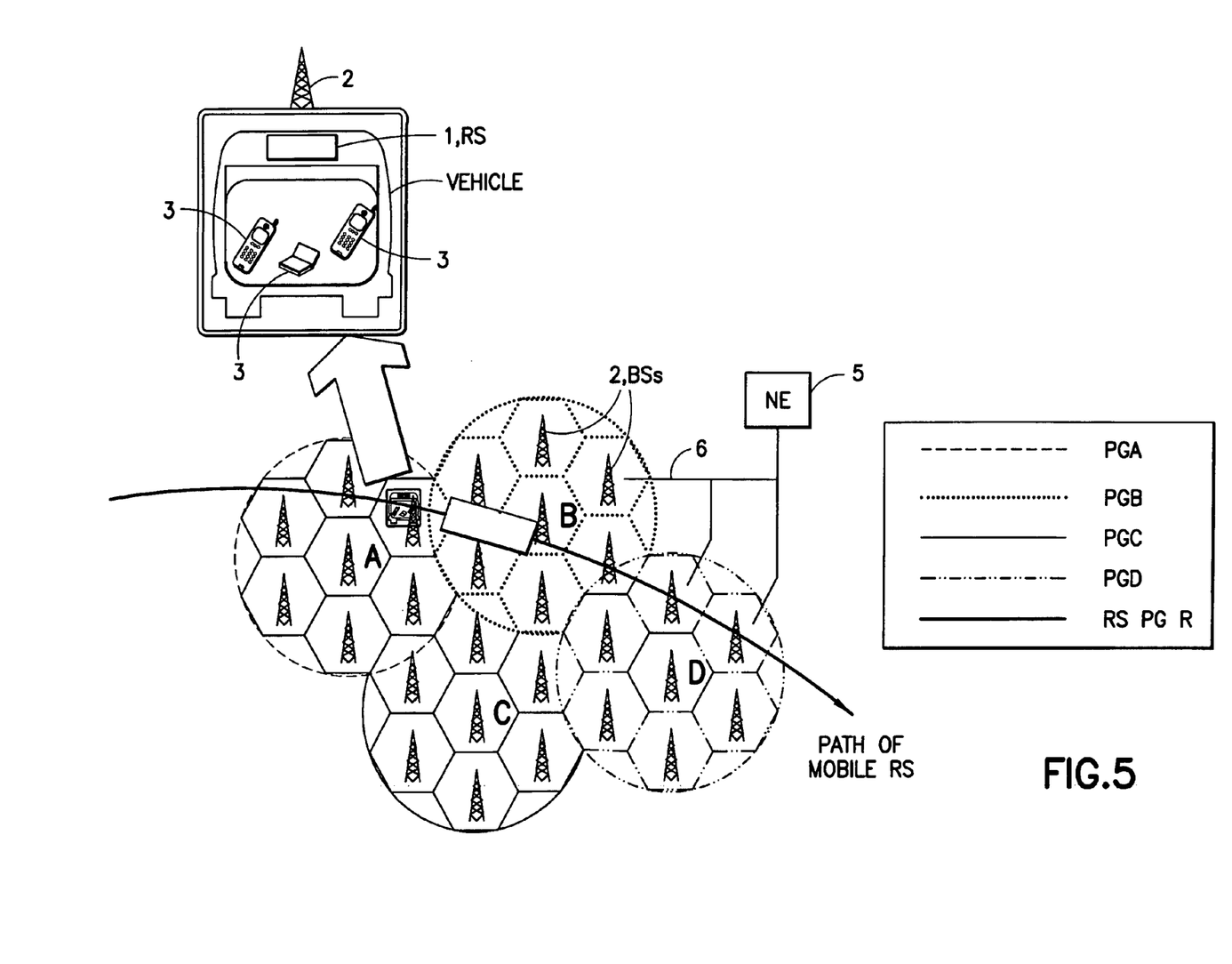
FIG. 5 shows an example of PGs in a cellular system and an exemplary path taken by the mobile RS through different PG areas.

FIG. 5 represents a non-limiting example of the assignment of a PG in the cellular network. The "arc" shows the path of the mobile RS 1 though the various cells. All of the BSs 2 transmit their PG list in a broadcast message. BSs 2 in PG area A transmit a PG list containing PG A, similarly BSs 2 in PG area B transmit a PG list that contains PG B, and so on. The assignment of the PG is controlled by some network entity such as the PC 5, and a given BS 2 may belong to more than one PG.

Note in this example that the RS 1 is shown as being installed aboard a vehicle, e.g., a city bus, and provides coverage for a plurality of different types of MSs 3 that are carried and used by passengers.

Figure 2:
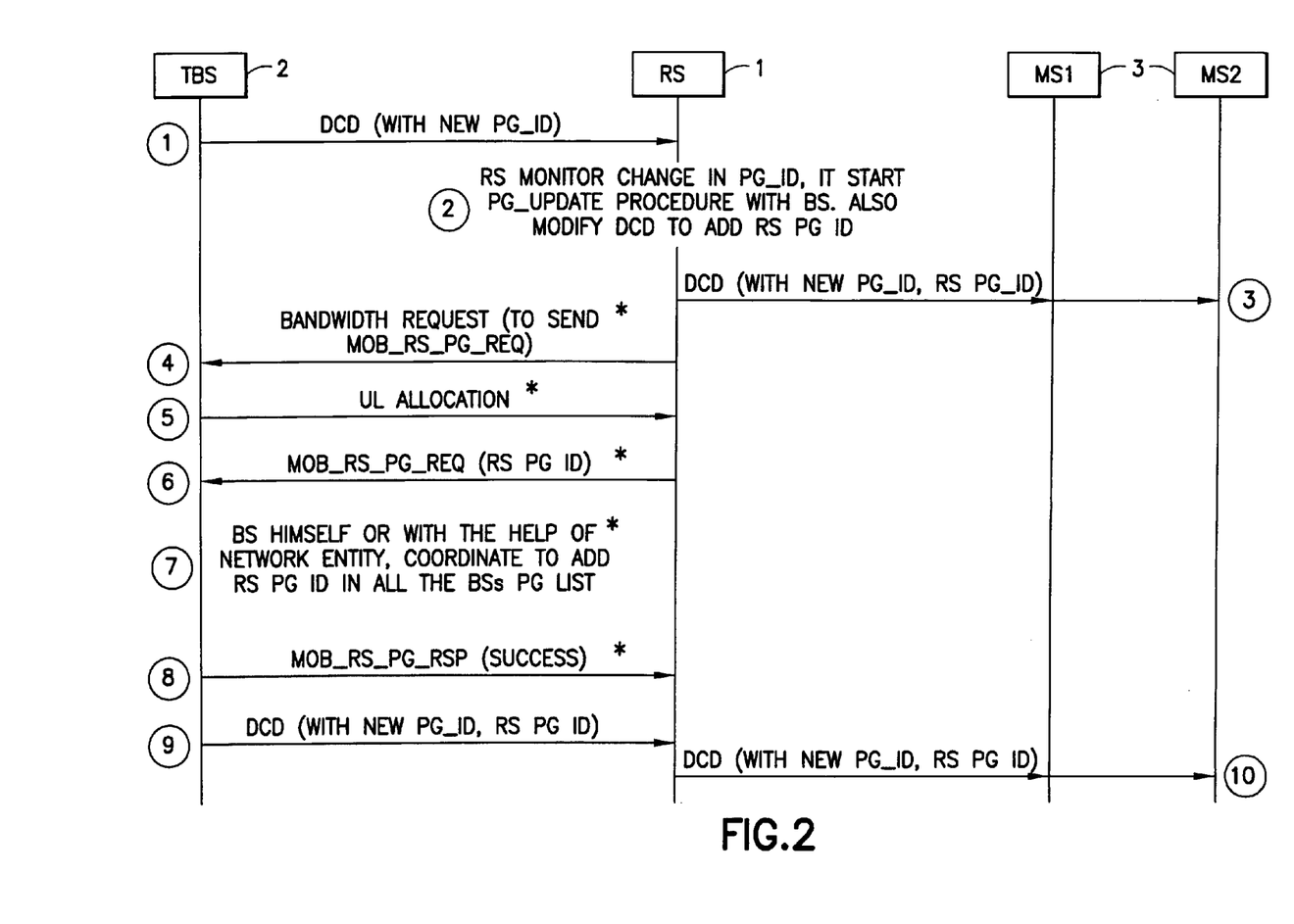
FIG. 2 is a message flow diagram that illustrates the operations that occur during use of an enhanced location update procedure in accordance with exemplary embodiments of this invention.

After the mobile RS 1 enters the PG Area A the RS 1 recognizes the new PG area by monitoring the DCD and/or MOB_PAG_ADV messages. It then exchanges messages MOB_RS_PG_REQ/MOB_RS_PG_RSP (details of the message exchange and parameters are described in FIG. 2) in order to add the mobile RS 1 PG R to the PG list transmitted by all the BSs 2 in PG area A. Note that the messages MOB_RS_PG_REQ/MOB_RS_PG_RSP are newly defined messages in accordance with the exemplary embodiments of this invention. This operation may be coordinated by the NE, such as the PC 5 (see FIG. 3). While the PG R of the mobile RS 1 is being added to the transmitted PG list of the BSs 1 (while the message exchange shown in FIG. 2 is ongoing), the mobile RS 1 also adds PG R in the relayed DCD and/or MOB_PAG_ADV messages so that the attached MSs 3 do not detect the change in PG area. In this non-limiting example it may be assumed that all of the MSs 3 attached to the mobile RS 1 have the same PG as that of the mobile RS 1 (e.g., PG R in this example).

Through the use of this approach the MS 3 does not detect a change in the PG due to mobility of the RS 1 and, therefore, does not initiate a change LU procedure. However, the network knows of the location of MS 3 based on the LU executed by the RS 1 and, therefore, can send a page message to the MS 3 if needed (e.g., if DL traffic for the MS 3 is received by the network).

Assuming now that the mobile RS 1 leaves PG A and enters PG B, it again exchanges messages MOB_RS_PG_REQ/MOB_RS_PG_RSP in order to add the PG R of the mobile RS 1 to the PG list transmitted by all BSs in PG area B. This again can be coordinated by the NE such as the PC 5. As before, while the PG R of the mobile RS 1 is being added to the transmitted PG list of the BSs 2 the mobile RS 1 again adds PG R into the relayed DCD and/or MOB_PAG_ADV messages so that the attached MSs 3 do not detect the change in PG area.

When the network entity adds PG R in the PG list of BSs 2 in the PG B, it may remove PG R from the PG list of those BSs 2 in the PG A in order to avoid unnecessary transmissions of PG R from the BSs 2 in PG A, and also avoid sending unnecessary paging messages from the BSs 2 in PG A.

However, when PG R is removed from the BS's PG list of PG area A, and if a MS 3 moves out of the coverage area of the mobile RS 1 to that of the coverage area of the BS 2, the MS 3 will perform the LU procedure. As such, the BS 2 may chose to delay the deletion of PG R for some period of time to reduce the probability that a MS 3, previously attached to the RS 1, will attempt a LU. However, the number of MSs 3 that leave, or enter, the mobile RS 1 coverage area would typically be significantly less than the total number of MS 3 that are attached to the mobile RS 1 and, therefore, the number of LUs that are initiated would be less.

Also, instead of each mobile RS 1 having its own PG, the network may determine to assign the same PG (for example, R) to multiple mobile RSs which are in some predetermined geographical area (e.g., PG R may be used for those RSs 1 located on trains in a city, and PG S may be assigned to those RSs 1 located on buses in a North zone or a South zone of the city, as non-limiting examples). The determination can be made based on, for example, the signaling load of paging and location update.

FIG. 2 is a message flow diagram that illustrates the operations that occur during use of an enhanced location update procedure in accordance with exemplary embodiments of this invention. In FIG. 2 (and in FIG. 3 described below) those messages and operations that are provided in accordance with the exemplary embodiments of this invention are indicated with an asterisk (*). FIG. 2 also shows the presence of two MSs 3, although more than two may be present and connected to the RS 1 at any given instant.

Reference may also be made to FIG. 4 during the ensuing description of FIG. 2.

Referring to FIG. 2, due to mobility of the RS 1 at Step 1 it receives a DCD (or any broadcast message that contains a paging group identification) with a new PG_ID. At Step 2, in response to the new RS_ID, the RS 1 begins a new PG_Update procedure with the BS 2. In accordance with an aspect of this invention, it also modifies the received DCD (or any broadcast message that contains a paging group identification) to add the PG_ID of the RS 1 (e.g., R) before relaying the DCD to the MSs 3 (Step 3). At Step 4 the RS 1 makes a bandwidth request to the BS 2 (to send a MOB_RS_PG_REQ message), and at Step 5 receives an UL allocation from the BS 2. At Step 6, and in response to the UL allocation, the RS 1 sends the MOB_RS_PG_REQ message to the BS 2. When the BS receives the MOB_RS_PG_REQ from the mobile RS 1, it sends this information in an RS_PG_ADD_REQ message to the network entity NE (e.g. PC 5) in the backbone network (Step 7).

Figure 3:
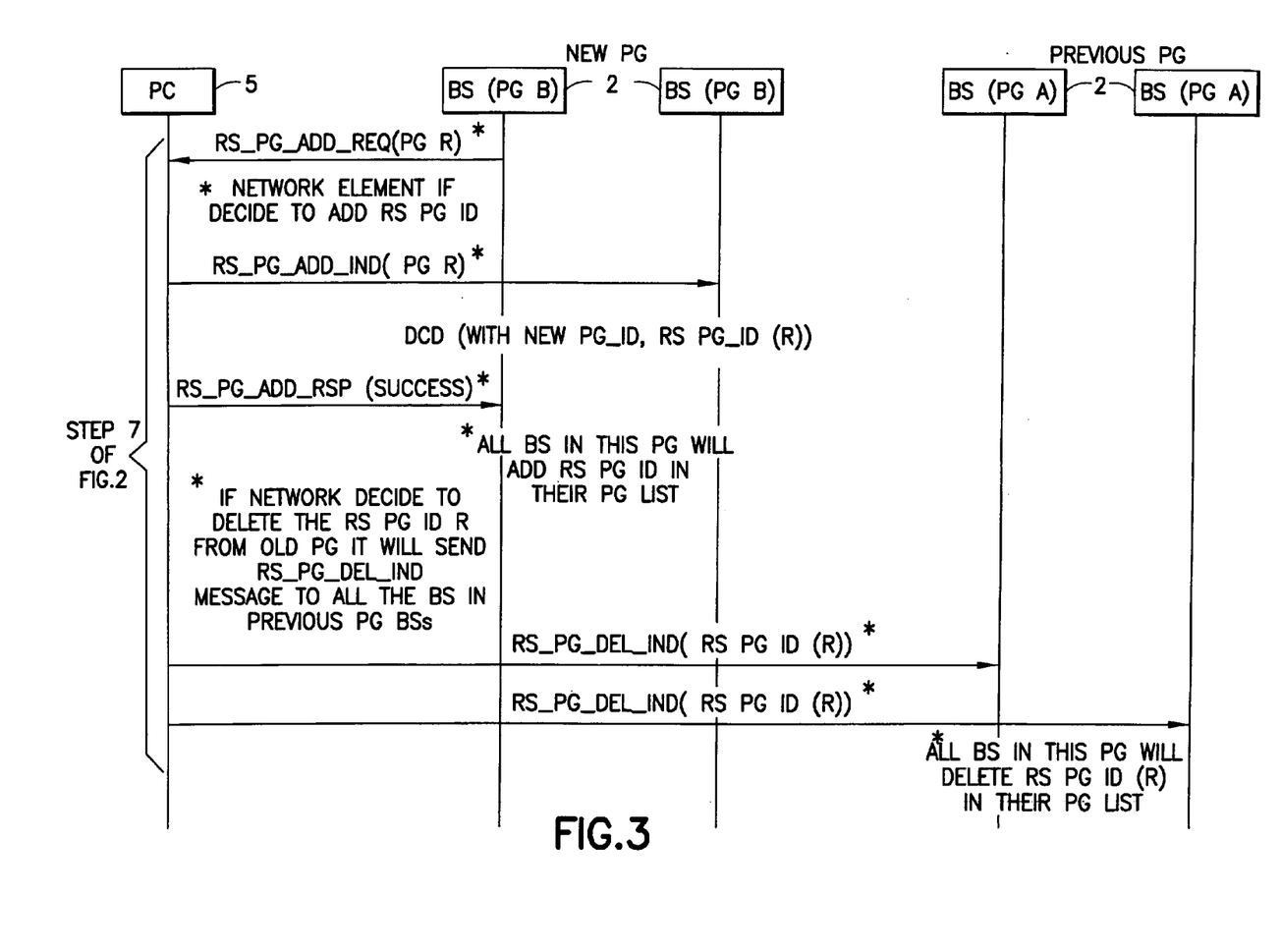
FIG. 3 is a message flow diagram that illustrates the operations that occur during message exchange over the network backbone (beyond the BS) in order to implement an exemplary aspect of this invention.

Reference is now also made to FIG. 3 for a more detailed explanation of the operation of Step 7 of FIG. 2. The NE (assumed for this example to be the PC 5) makes a decision to either allow or deny the adding of the mobile RS PG_ID (e.g., based on network operator policy, current loading, or some other criterion or criteria). If the NE allows the addition of the mobile RS PG_ID, it sends a RS_PG_ADD_IND message, with PG R of the RS 1, to all other BSs 2 in that PG, and it sends a RS_PG_ADD_RSP message back to the BS from which the PC 5 received the RS_PG_ADD_REQ message. Now all the BSs 2 in the new PG (PG B in this example) have the RS PG_ID added to their respective PG lists. In addition, the NE (based on network implementation) may also send a RS_PG_DEL_IND message to all the BSs in the previous PG where the mobile RS 1 was earlier attached. With this procedure, the network has the exact location of the MSs 3 attached to the RS 1, and can page the MSs 3 for DL traffic without incurring added paging load in the network (by not paging a particular MS 3 in the previous PG).

Returning to FIG. 2, at Step 8 the BS 2 may forward the RS_PG_ADD_RSP message that it received from the NE to the RS 2. At Step 9 the BS 2 sends a DCD (or any broadcast message that contains a paging group identification), this time with the new PG_ID that includes the newly added RS PG_ID, and the RS 1 can then simply relay the DCD to the MSs 3, without having to insert its RS PG_ID as it did previously at steps 2 and 3.

It should be noted that in FIG. 2 the MSs 3 need not be modified to accommodate the newly defined signaling between the RS 1 and the BS 2, and between the BS 2 and the NE 5. That is, the MSs 3 may operate in a normal fashion, and may not be aware of the details, or even the occurrence, of the newly defined operations and signaling taking place between the RS 1, the BS 2 and the NE 5.

It should be appreciated that a number of advantages can be gained by the use of the exemplary embodiments of this invention including, but not limited to, no change is required in the MS 3 implementation, spectrally efficient signaling is provided, there is reduced congestion on the BS-RS and RS-MS links, and the overall latency for the MS location update, via the RS 1, can be reduced.

In one exemplary embodiment of the invention, a method, comprising: in response to a relay node detecting a new paging group identification, sending a message to a network node, the message requesting the network access node to use a particular paging group identification; while waiting for the network access node to begin using the particular paging group identification, modifying a message received from the network access node to include the particular paging group identification; and sending the modified message to a group of attached user nodes.

In another exemplary embodiment of the invention, a computer program product embodied on a computer readable medium and comprising program instructions the execution of which by a data processor of a relay node result in operations that comprise: in response to detecting a new paging group identification, sending a message to a network node, the message requesting the network access node to use a particular paging group identification; while waiting for the network access node to begin using the particular paging group identification, modifying a message received from the network access node to include the particular paging group identification; and sending the modified message to a group of attached user nodes.

In another exemplary embodiment of the invention, a relay node, comprising: at least one wireless transceiver to conduct communications with a network access node and with user nodes; and a control unit coupled to the wireless transceiver and operable, in response to a relay node detecting a new paging group identification, to send a message to a network node, the message requesting the network access node to use a particular paging group identification, further operable, while waiting for the network access node to begin using the particular paging group identification, to modify a message received from the network access node to include the particular paging group identification and to transmit the modified message to a group of attached user nodes.

In another exemplary embodiment of the invention, a method, comprising: operating a network access node to receive a message from a relay node, the message comprising a request to add a particular paging group identification to a list of paging group identifications transmitted by the network access node; contacting a network backbone node to request permission to add the particular paging group identification to the list of paging group identifications transmitted by the network access node; and upon being granted permission, adding the particular paging group identification to the list of paging group identifications transmitted by the network node.

In another exemplary embodiment of the invention, a computer program product embodied on a computer readable medium and comprising program instructions the execution of which by a data processor of a network access node result in operations that comprise: receiving a message from a relay node, the message comprising a request to add a particular paging group identification to a list of paging group identifications transmitted by the network access node; contacting a network backbone node to request permission to add the particular paging group identification to the list of paging group identifications transmitted by the network access node; and upon being granted permission, adding the particular paging group identification to the list of paging group identifications transmitted by the network node.

In another exemplary embodiment of the invention, a network access node, comprising: at least one wireless transceiver to conduct communications with a relay node that is wirelessly coupled to a plurality of user nodes; and a control unit coupled to the wireless transceiver and operable to receive a message from a relay node, the message comprising a request to add a particular paging group identification to a list of paging group identifications transmitted by the network access node, said control unit further operable to contact a network backbone node to request permission to add the particular paging group identification to the list of paging group identifications transmitted by the network access node and, upon being granted permission, to add the particular paging group identification to the list of paging group identifications transmitted by the network node.

In another exemplary embodiment of the invention, a method, comprising: receiving at a network backbone node a message from a network access node, the message comprising a request originated by a relay node to add a particular paging group identification to a list of paging group identifications transmitted by the network access node; and upon granting the request, instructing network access nodes associated with at least one paging group to add the particular paging group identification to the list of paging group identifications transmitted by the network access nodes.

In another exemplary embodiment of the invention, a computer program product embodied on a computer readable medium and comprising program instructions the execution of which by a data processor of a network backbone node result in operations that comprise: receiving a message from a network access node, the message comprising a request originated by a relay node to add a particular paging group identification to a list of paging group identifications transmitted by the network access node; and upon granting the request, instructing network access nodes associated with at least one paging group to add the particular paging group identification to the list of paging group identifications transmitted by the network access nodes.

In another exemplary embodiment of the invention, a network backbone node, comprising: an interface for coupling to a plurality of network access nodes through a backbone network; and a control unit coupled to the interface and operable to receive a message from one of the plurality of network access nodes, the message comprising a request originated by a relay node to add a particular paging group identification to a list of paging group identifications transmitted by the network access node and, upon granting the request, said control unit instructing network access nodes associated with at least one paging group to add the particular paging group identification to the list of paging group identifications transmitted by those network access nodes.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, message flow diagrams, or using some other pictorial representation, it is well understood that these blocks, apparatus, systems, techniques and/or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As but some examples, the use of other similar or equivalent message formats, types and names may be attempted by those skilled in the art. However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
   in response to a relay node detecting a new paging group identification, sending, by the relay node, a message to a network access node, the message requesting the network access node to use a particular paging group identification;
   while waiting for the network access node to begin using the particular paging group identification, modifying, by the relay node, a message received from the network access node to include the particular paging group identification; and
   sending, by the relay node, the modified message to a group of attached user nodes.

2. The method of claim 1, further comprising in response to the network access node beginning to use the particular paging group identification, sending another instance of the message received from the network access node to the group of attached user nodes without modifying a paging group identification part of the message.

3. The method of claim 2, where the message received from the network access node is a Downlink Channel Descriptor message or any other broadcast message that contains a paging group identification.

4. A computer readable medium storing program instructions, the execution of which by a data processor of a relay node results in operations comprising:
   in response to detecting a new paging group identification, sending a message to a network access node, the message requesting the network access node to use a particular paging group identification;
   while waiting for the network access node to begin using the particular paging group identification, modifying a message received from the network access node to include the particular paging group identification; and
   sending the modified message to a group of attached user nodes.

5. The computer readable medium of claim 4, the operations further comprising: in response to the network access node beginning to use the particular paging group identification, sending another instance of the message received from the network access node to the group of attached user nodes without modifying a paging group identification part of the message.

6. The computer readable medium of claim 5, where the message received from the network access node is a Downlink Channel Descriptor message or any other broadcast message that contains a paging group identification.

7. An apparatus, comprising:
   at least one wireless transceiver operable to conduct communications with a network access node and with user nodes; and
   a control unit operable, in response to the apparatus detecting a new paging group identification, to send a message to a network access node, the message requesting the network access node to use a particular paging group identification, and further operable, while waiting for the network access node to begin using the particular paging group identification, to modify a message received from the network access node to include the particular paging group identification and to transmit the modified message to a group of attached user nodes.

8. The apparatus of claim 7, said control unit further operable, in response to the network access node beginning to use the particular paging group identification, to transmit another instance of the message received from the network access node to the group of attached user nodes without modifying a paging group identification part of the message.

9. The apparatus of claim 8, where the message received from the network access node is a Downlink Channel Descriptor message or any other broadcast message that contains a paging group identification.

10. A method, comprising:
    operating a network access node to receive a message from a relay node, the message comprising a request to add a particular paging group identification to a list of paging group identifications transmitted by the network access node;
    contacting, by the network access node, a network backbone node to request permission to add the particular paging group identification to the list of paging group identifications transmitted by the network access node; and
    upon being granted permission, adding, by the network access node, the particular paging group identification to the list of paging group identifications transmitted by the network access node.

11. The method of claim 10, further comprising subsequently removing the particular paging group identification from the list of paging group identifications transmitted by the network access node in response to a further message received from the network backbone node.

12. The method of claim 11, where the list of paging group identifications is transmitted by the network access node in a Downlink Channel Descriptor message or any other broadcast message that contains a paging group identification.

13. The method of claim 10, where the particular paging group identification is first received from a mobile relay node that has entered a cell of the network access node.

14. A computer readable medium storing program instructions, the execution of which by a data processor of a network access node results in operations comprising:
receiving a message from a relay node, the message comprising a request to add a particular paging group identification to a list of paging group identifications transmitted by the network access node;
contacting a network backbone node to request permission to add the particular paging group identification to the list of paging group identifications transmitted by the network access node; and
upon being granted permission, adding the particular paging group identification to the list of paging group identifications transmitted by the network access node.

15. The computer readable medium of claim 14, the operations further comprising subsequently removing the particular paging group identification from the list of paging group identifications transmitted by the network access node in response to a further message received from the network backbone node.

16. The computer readable medium of claim 15, where the list of paging group identifications is transmitted by the network access node in a Downlink Channel Descriptor message or any other broadcast message that contains a paging group identification.

17. The computer readable medium of claim 15, where the particular paging group identification is first received from a mobile relay node that has entered a cell of the network access node.

18. An apparatus, comprising:
at least one wireless transceiver operable to conduct communications with a relay node that is wirelessly coupled to a plurality of user nodes; and
a control unit operable to receive a message from a relay node, the message comprising a request to add a particular paging group identification to a list of paging group identifications transmitted by the apparatus, said control unit further operable to contact a network backbone node to request permission to add the particular paging group identification to the list of paging group identifications transmitted by the apparatus and, upon being granted permission, to add the particular paging group identification to the list of paging group identifications transmitted by the apparatus.

19. The apparatus of claim 18, said control unit further operable to remove the particular paging group identification from the list of paging group identifications transmitted by the apparatus in response to a further message received from the network backbone node.

20. The apparatus of claim 18, where the list of paging group identifications is transmitted by the apparatus in a Downlink Channel Descriptor message or any other broadcast message that contains a paging group identification.

21. The apparatus of claim 18, where the particular paging group identification is first received from a mobile relay node that has entered a cell of the apparatus.

22. A method, comprising:
receiving at a network backbone node a message from a network access node, the message comprising a request originated by a relay node to add a particular paging group identification to a list of paging group identifications transmitted by the network access node; and
upon granting the request, instructing, by the network backbone node, network access nodes associated with at least one paging group to add the particular paging group identification to the list of paging group identifications transmitted by the network access nodes.

23. The method of claim 22, further comprising subsequently instructing the network access nodes associated with the at least one paging group to delete the particular paging group identification to the list of paging group identifications transmitted by the network access nodes.

24. A computer readable medium storing program instructions, the execution of which by a data processor of a network backbone node results in operations comprising:
receiving a message from a network access node, the message comprising a request originated by a relay node to add a particular paging group identification to a list of paging group identifications transmitted by the network access node; and
upon granting the request, instructing network access nodes associated with at least one paging group to add the particular paging group identification to the list of paging group identifications transmitted by the network access nodes.

25. The computer readable medium of claim 22, the operations further comprising: subsequently instructing the network access nodes associated with the at least one paging group to delete the particular paging group identification to the list of paging group identifications transmitted by the network access nodes.

26. An apparatus, comprising:
an interface operable to couple to a plurality of network access nodes through a backbone network; and
a control unit operable to receive a message from one of the plurality of network access nodes, the message comprising a request originated by a relay node to add a particular paging group identification to a list of paging group identifications transmitted by the network access node and, upon granting the request, said control unit is further operable to instruct network access nodes associated with at least one paging group to add the particular paging group identification to the list of paging group identifications transmitted by those network access nodes.

27. The apparatus of claim 26, said control unit further operable to subsequently instruct those network access nodes associated with the at last one paging group to delete the particular paging group identification from the list of paging group identifications transmitted by the network access nodes.

* * * * *